United States Patent [19]
En

[11] 3,831,144
[45] Aug. 20, 1974

[54] MULTI-LEVEL ERROR DETECTION CODE

[75] Inventor: John En, Palatine, Ill.

[73] Assignee: Motorola, Inc., Chicago, Ill.

[22] Filed: June 11, 1973

[21] Appl. No.: 368,803

[52] U.S. Cl. .............. 340/146.1 AL, 340/146.1 AG
[51] Int. Cl. .............................................. H04l 1/10
[58] Field of Search ......... 340/146.1 AG, 146.1 AL, 340/146.1 AQ

[56] References Cited

UNITED STATES PATENTS

| | | | |
|---|---|---|---|
| 2,954,433 | 9/1960 | Lewis et al. | 340/146.1 AL |
| 3,008,004 | 11/1961 | Young | 340/146.1 AG |
| 3,144,634 | 8/1964 | Wright | 340/146.1 AL |
| 3,183,483 | 5/1965 | Lisowski | 340/146.1 AG |
| 3,200,374 | 8/1965 | Ballard | 340/146.1 AG |
| 3,562,711 | 2/1971 | Davis et al. | 340/146.1 AL |
| 3,582,878 | 6/1971 | Bossen et al. | 340/146.1 AL |
| 3,638,182 | 1/1972 | Burton et al. | 240/146.1 AL |

FOREIGN PATENTS OR APPLICATIONS

| | | | |
|---|---|---|---|
| 45-6443 | 3/1970 | Japan | 340/146.1 AG |

*Primary Examiner*—Malcolm A. Morrison
*Assistant Examiner*—Stephen Dildine, Jr.
*Attorney, Agent, or Firm*—Eugene A. Parsons; Vincent Rauner

[57] ABSTRACT

An error detecting coding and decoding system employing an encoder having a plurality of shift register systems for generating independent sequences of check bits for multiple level checks. A decoder having similar shift registers is employed to regenerate the check bits from the transmitted information and to compare the locally generated check bits with the transmitted check bits generated by the encoder.

13 Claims, 6 Drawing Figures

MULTI-LEVEL ERROR DETECTION CODE

BACKGROUND

1. FIELD OF INVENTION

This invention relates generally to error detecting coding systems, and more particularly to multiple level error detecting systems which perform a plurality of independent checks on the incoming information.

2. PRIOR ART

There are many applications wherein it is necessary to provide an error detecting system for a data transmission system. Several techniques for providing error detections are known. These techniques include half rate codes and matrix or product codes.

Whereas these techniques provide a way to achieve error detection, the half rate codes require a large number of redundant information check bits to be transmitted, whereas the matrix or product codes allow certain types of errors to pass undetected.

SUMMARY

It is an object of the present invention to provide an improved error detecting coding system having greatly improved error detecting capability.

It is a further object of this invention to provide an error detecting coding system that may be implemented using a minimal number of components.

It is a still further object of this invention to provide a high accuracy error detecting system requiring a minimal number of check bits to be transmitted.

In accordance with a preferred embodiment of the invention, the information digits to be transmitted are passed in parallel through a plurality of shift registers, each of which has a different number of stages. Each shift register includes a feedback loop connected between the input and output thereof for generating check digits in each of the shift registers. The information digits and the check digits generated by each of the shift registers are sequentially transmitted by means of a suitable transmission link.

The decoder employs a plurality of shift register systems, similar to the shift register systems used in the encoder, to regenerate the check digits from the received information digits. The regenerated check digits are compared with the received check digits generated by the encoder and an error signal is generated in response to a lack of correspondence between any corresponding check digits.

DETAILED DESCRIPTION

Figure 1:
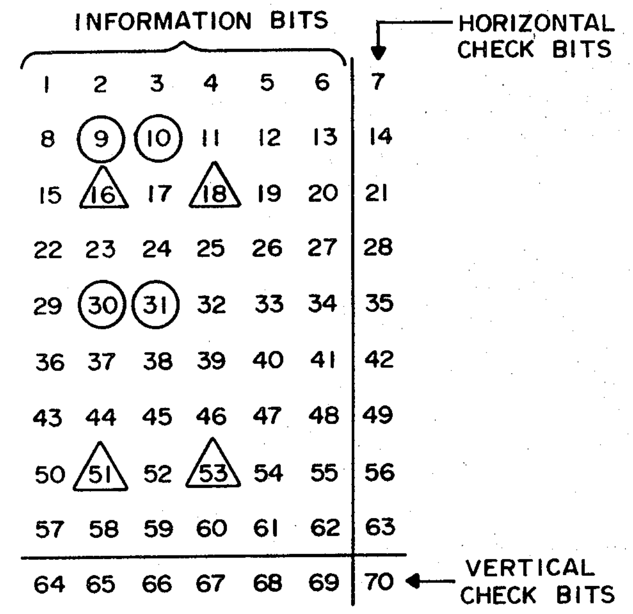
FIG. 1 is a table illustrating the relationship between the information digits and the check digits of one of the error detecting levels of the system according to the invention, and is included to illustrate the operation of the system.

Referring to FIG. 1, the information digits, which in this embodiment are binary digits, or bits, are arranged into words having six bits each. The words are represented in FIG. 1 by the numbers 1–6, 8–13, 15–20 through 57–62, each number representing one bit in the word. Following each word, a check bit is transmitted. The check bits at the end of each word are referred to as horizontal check bits in this discussion. The horizontal check bits are in the right hand column of FIG. 1 and includes the bits numbered 7, 14, 21 through 63 in the right hand column. Each of the check bits provides a check of the information immediately preceeding the particular check bit. For example, the check bits may be selected such that the number of ones in each word plus its associated check bit is either odd or even. Using the horizontal check, all error patterns having an odd number of errors per word will be detected by means of a horizontal check.

A similar check, referred to as a vertical check for purposes of discussion, is also utilized to detect some of the errors not detected by the horizontal check. The vertical check bits 64–70 of FIG. 1 provide the vertical check. In implementing the vertical check, in this embodiment, every seventh bit in the information bit stream (where the horizontal check bits are considered part of the information bit stream) is counted and a vertical check bit is selected to make the total number of ones either odd or even. In FIG. 1, the words are arranged such that the bits corresponding to similar positions in each word are counted and an appropriate check bit added to make the total either odd or even. For example, the bits 1, 8, 15 through 57 are counted and the vertical check bit 64 is added to the count to make the total number of ones either odd or even, as desired. Similarly, the ones in the bits 2, 9, 16 through 58 are counted and the check bit 65 is added to the count, and the process is repeated for the remaining columns. As in the case of the horizontal check, the vertical check will detect any error pattern having an odd number of errors in any column.

Because the horizontal check will not detect an even number of errors in any row, and the vertical check will not detect an even number of errors in any column, an error pattern appearing as a rectangle in the bit arrangement of FIG. 1 will not be detected. For example, if the encircled bits 9, 10 and 30, 31 are in error, the errors will not be detected by either the horizontal or vertical checks. Similarly, if the bits 16, 18 and 51, 53, enclosed in triangles, are an error the errors will not be detected.

Figure 2:
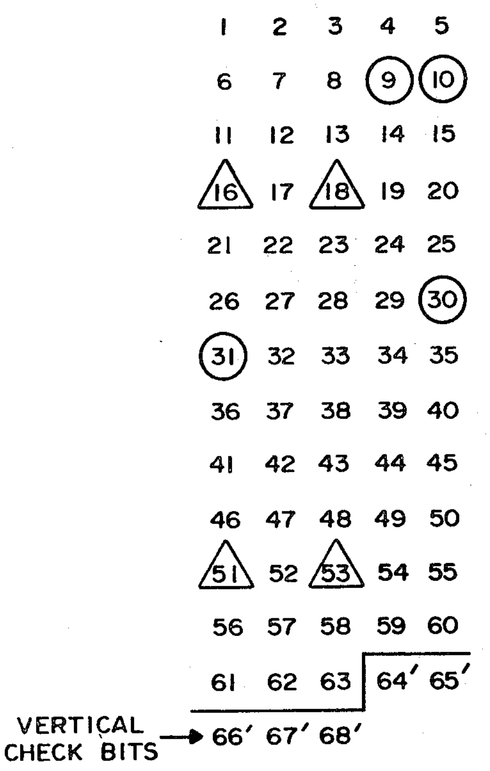
FIG. 2 is a table showing the relationship between the information digits and the check digits provided by a second level error detection check by the system according to the invention.

To provide for detection of errors that are not detected by the above described check, the system according to the invention provides multiple level checks to assure that errors undetected by one of the checks are detected by another. FIG. 2 shows a second level check for the error detection system according to the invention. To provide the second level check, in this embodiment, every fifth bit in the bit stream (the horizontal check bits of FIG. 1 being considered part of the bit stream) is counted, and additional vertical check bits are employed to make the counts either odd or even. Referring to FIG. 2, the information bits are arranged into five rather than seven columns, and a set of new vertical check bits 64′–68′ is employed to perform new vertical checks on the rearranged data. As in the case of the arrangement of FIG. 1, the vertical check bits are selected such that the total number of ones in each column is either odd or even to provide for the detection of an odd number of errors in each column. If we assume, as in the case of FIG. 1, that the errors occur in groups of four, the bits 9, 10, 30, 31 or 16, 18, 51, 53 being in error, in the arrangement of FIG. 2, an odd number of errors from the group 9, 10, 30, 31 lies in each of the first and fourth columns. Since an odd number of errors in any column can be detected by the vertical check, the errors 9 and 31, which were not detected by the arrangement of FIG. 1, are readily detected by the check of FIG. 2. However, the third and fifth columns each contain two errors from the group 16, 18, 51, 53 which remain undetected.

Figure 3:
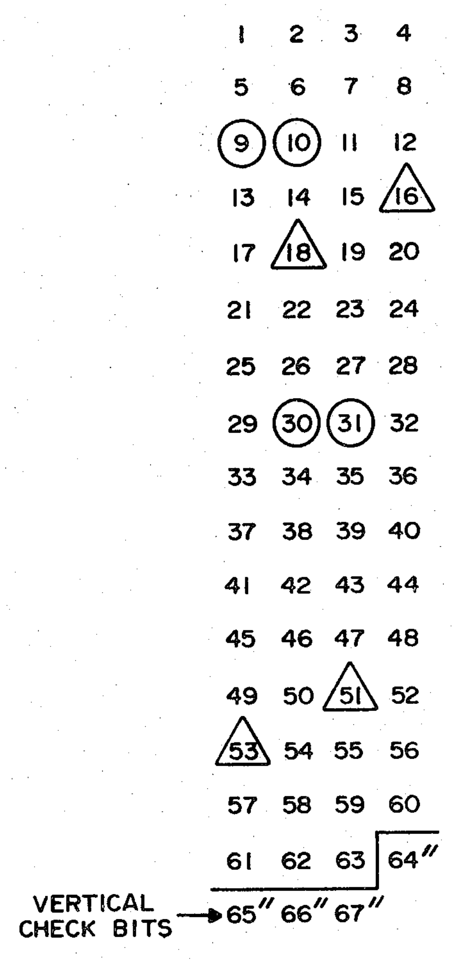
FIG. 3 is a chart showing the relationship between the information digits and the check digits for the third level error detection check by the system according to the invention.

Referring to FIG. 3, the information bits are arranged into a four column array, and a new set of check bits 64″–67″ are provided for checking errors in each of the four columns. In the matrix of FIG. 3, the errors from the groups 16, 18, 51, 53 each lie in a different column, thereby allowing the errors to be detected.

Hence, it can be seen that the errors in both of the error patterns 9, 10, 30, 31 and 16, 18, 51, 53 were detected by the multiple level checks. To perform the additional checks, only nine more check bits were necessary over those required in a normal matrix code to provide a much greater error detection capability. In the illustrated embodiment, each of the subsequent level checks utilized fewer columns than the original check, however, any number of columns may be used. The only constraint is that to avoid redundancy, the number of columns (vertical checks) in any level check shall not be an integral multiple of the number of columns in any other check.

Figure 4:
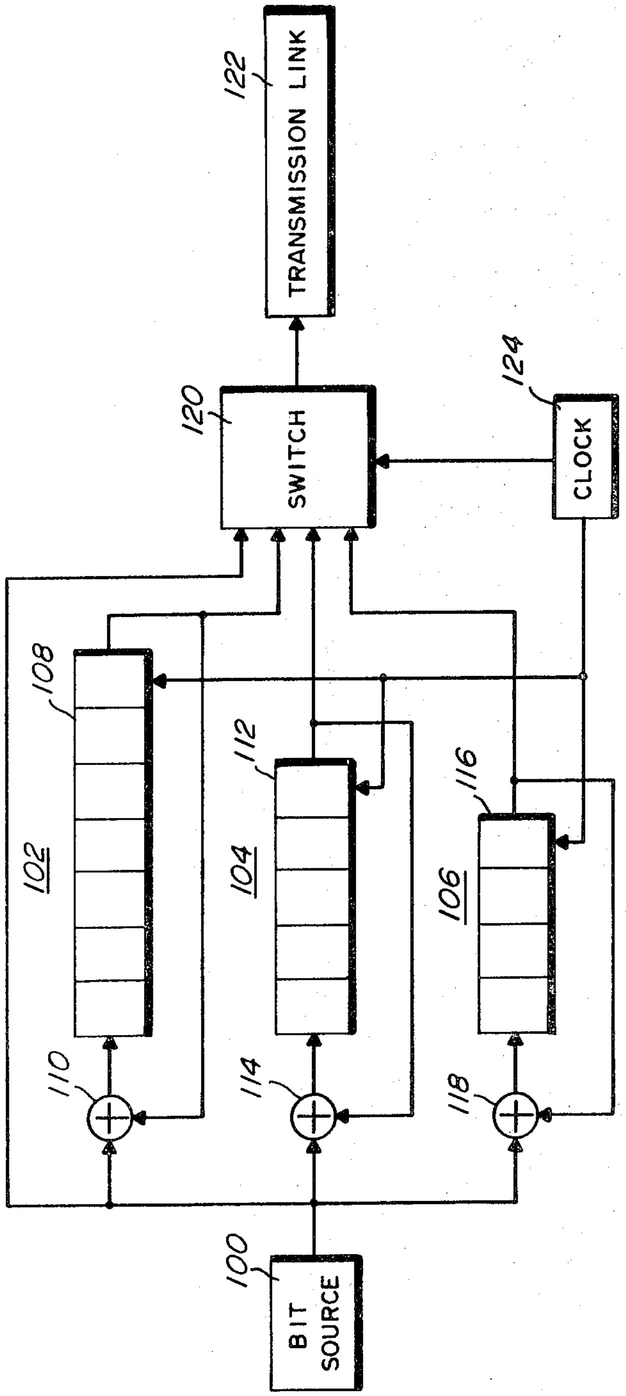
FIG. 4 is a block diagram showing an embodiment of an encoder for generating the code connecting to the invention.

Referring to FIG. 4, there is shown a block diagram of an encoder for generating the check bits for the multi-level check. A bit source 100 is connected to three sample and storage means, in this embodiment, the shift register systems 102, 104 and 106. The shift register system 102 employs a seven stage shifter register 108 connected to the bit source through an adding circuit 110. The output of the shift register 108 is connected to a second input of the adding circuit 110 to provide a feedback loop. Similarly, the shift register system 104 employs a five stage shift register 112 and an adding circuit 114, while the shift register system 106 utilizes a four stage shift register 116 and an adding circuit 118. A sequencing switch 120 is connected to the bit source 100 and to the output of each of the shift register systems 102, 104 and 106. The output of the switch 120 is connected to a transmission link 122. The transmission link 122 may be any suitable transmission link, such as, for example, a radio link or a telephone line. A clock 124 is connected to the switch 120 and to each of the shift register systems 102, 104 and 106 to provide synchronization for the system.

For purposes of illustration, it shall be assumed that the bit source 100 provides the information digits shown in FIGS. 1–3, including the horizontal check bits. The digits from the bit source 100, which are binary digits or bits in this embodiment, are applied in parallel to the switch 120 and each of the shift register systems 102, 104 and 106. The vertical check bits are generated by the shift register systems 102, 104 and 106, the system 102 generating the bits 64–70 and the systems 104 and 106 generating the bits 64′–68′ and 64″–67″, respectively.

To illustrate how the vertical check bits are generated, the operation of the shift register system 102 will be described. In operation, the bits from the bit source 100 are applied to the shift register 108 through the summing circuit 110. If we assume that each of the stages in the shift register 108 has been initially set to zero, after seven shifts have taken place, the shift register 108 contains the first seven information bits from the bit source 100. When the eighth bit is applied to the shift register 108, the first bit must be shifted out because the shift register 108 has only seven stages. The shifted out first bit is applied to the summing circuit 110 along with the eighth bit from the bit source 100. The first and eighth bits applied to the summing circuit 110 are added and the sum is applied to the first stage of the shift register 108. Similarly, the ninth bit from the bit source 100 is combined with the second bit from the shift register 108, the third with the tenth, the fourth with the eleventh, and the process is continued until all of the bits from the bit source 100 have been applied to the shift register system 102, at the end of which time the shift register 108 will contain in each of its stages a bit indicative of the sum of every seventh information bit to provide the vertical check bits. Because each of the check bits need only indicate whether the sum of each column is odd or even, the entire sum of each column need not be stored. Hence, in this embodiment, each of the summing circuits 110, 114 and 118 may be a modulo 2 adder which provides only a single one or zero to indicate whether the sum is odd or even. Each stage in each of the shift registers 102, 104 and 106 can be a binary storage element which stores only a single one or zero. The operation of the shift registers 104 and 106 which generate the remaining check bits is similar to the operation of the shift register system 102. The only difference is that the shift registers 112 and 116 contain five and four stages, respectively, for summing every fifth and fourth bit from the bit source 100, as shown in FIGS. 2 and 3, respectively.

The switch 120 sequentially connects the outputs of the bit source 100 and the shift register systems 102, 104 and 106 to the transmission link 122. During the time interval that the information bits are being generated by the bit source 100, the switch connects the bit source 100 to the transmission link 122 to provide for transmission of the information digits. Subsequent to the transmission of the information digits, the output of the shift register system 102 is applied to the transmission link 122 and the check bits generated by the shift register system 102 are read out under the control of the clock 124 and applied to the transmission link 122. Subsequent to the reading out of the shift register 102, the shift registers 104 and 106 are read out, and the bits stored therein applied to the transmission link 122.

Figure 4A:
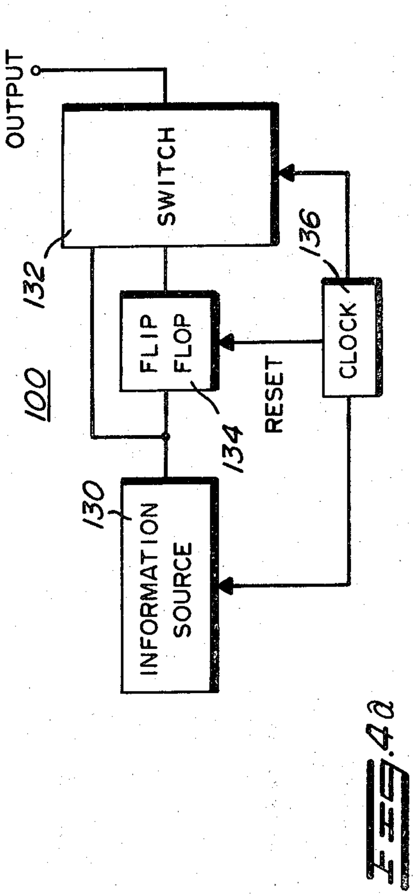
FIG. 4*a* is a detailed block diagram of the bit source of FIG. 4 showing apparatus for generating horizontal check bits for the code according to the invention.

As was stated in the foregoing, every seventh bit from the bit source 100 was assumed to be a horizontal check bit. The horizontal check bits may be generated by a system similar to the one known in FIG. 4*a*. Referring to FIG. 4*a*, an information signal source 130 is connected to a switch 132 and a flip-flop 134. The output of the flip-flop 134 is also connected to the switch 132, and a clock 136 is connected to the information source 130, the flip-flop 134 and the switch 132. The output of the switch 132 corresponds to the output of the bit source 100 of FIG. 4, and is connected to the switch 120 and the shift register systems 102, 104 and 106.

The information source 130 provides information bits in the form of words having a length of six bits each. The information bits from the information source 130 are applied in parallel to the flip-flop 134 and the switch 132. Each 1 from the information source 130 causes the flip-flop 134 to change state, hence the flip-flop 134 serves as a counter for determining whether the number of 1's in each six bit word is odd or even. The clock 134 controls the operation of the information source 130, the flip-flop 134 and the switch 132. In operation, the clock 136 renders the information source 130 operative to provide a six bit word and simultaneously causes the switch 132 to pass the six bit word to an output thereof. After the six bit word has been generated, the information from the information source 130 is temporarily inhibited, the switch 132 switched to pass an output from the flip-flop 134, and the flip-flop 134 read out to provide the horizontal check bit. After the flip-flop 134 has been read out, it is reset by the clock 136, and the process is repeated for the next six bit word from the information source 130.

Figure 5:
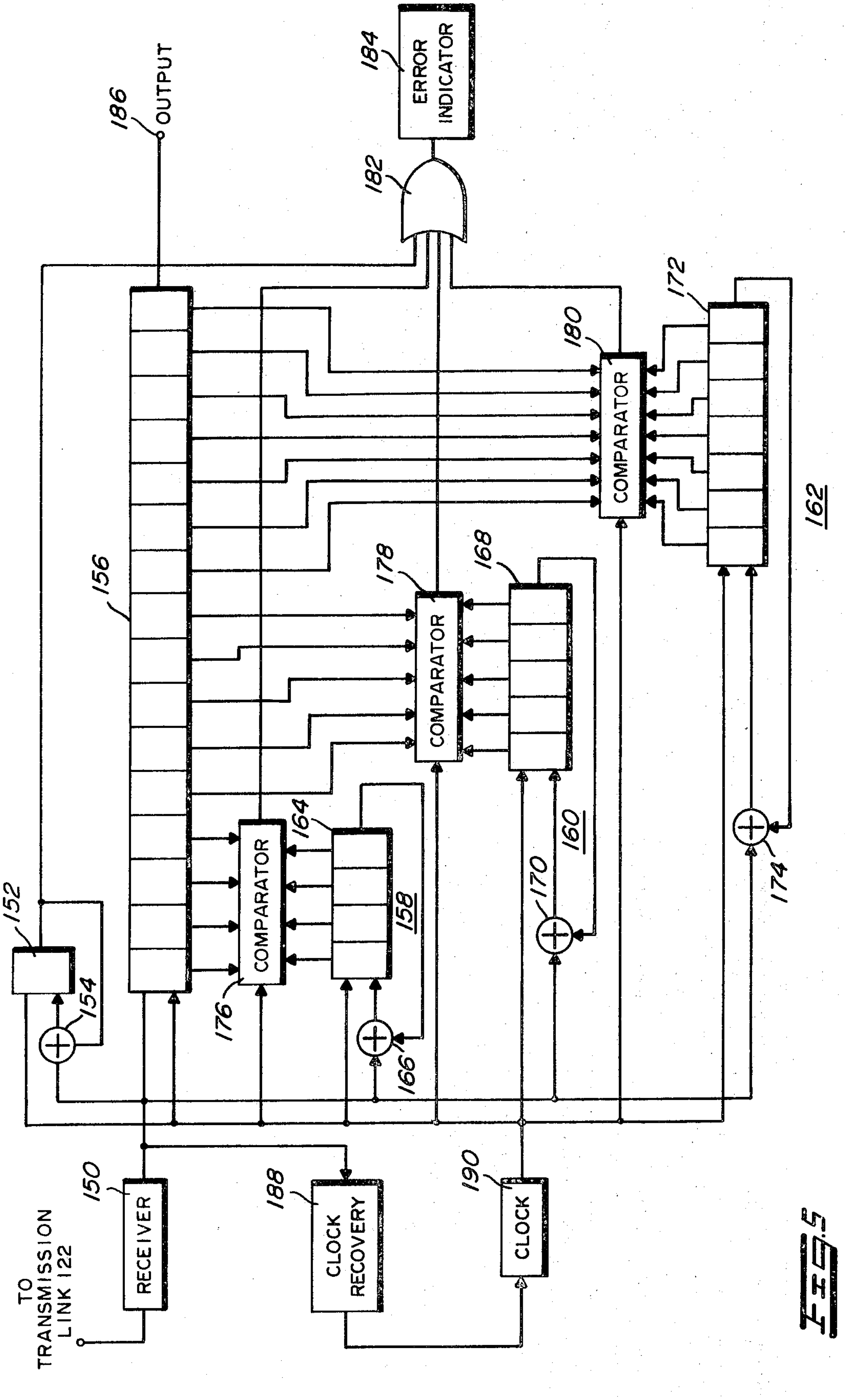
FIG. 5 is a block diagram showing an embodiment of a decoder for a system employing the multi-level error detecting code according to the invention.

Referring to FIG. 5, in the decoder portion of the error detection system according to the invention, a receiver 150 is connected to the transmission link 122 of FIG. 4. The receiver 150 may be any type of receiver compatible with a particular transmission link used, and may be, for example, a radio receiver or a telephone line coupler. The output of the receiver 150 is connected to a single stage shift register 152 through a summing circuit 154 which is also connected to the output of the shift register 152. Alternately, the summing circuit 154 and shift register 152 may be replaced by a flip-flop. The output of the receiver 150 is also connected to four sample and storage means including a sixteen stage shift register 156, a four stage shift register system 158, a five stage shift register system 160, and a seven stage shift register system 162. The shift register system 158 is similar to the shift register system 106 of FIG. 4 and includes a four stage shift register 164 and a summing circuit 166. The shift register system 160 includes a five stage shift register 168 and a summing circuit 170, while the shift register system 162 includes a seven stage shift register 172 and a summing circuit 174. The shift register systems 160 and 162 are similar to the shift register systems 104 and 102, respectively, of FIG. 4. A comparison means including a comparator circuit 176 is connected to the first four stages of the shift register 156 and to each stage of the shift register 164. A second comparator circuit 178 is connected to the fifth through ninth stages of the shift register 156 and to the 5 stages of the shift register 168. A third comparator circuit 180 is connected to the last seven stages of the shift register 156 and to each stage of the shift register 172. In an alternate embodiment, a single comparator circuit connected to each stage of the shift register 156 and to each stage of each of the shift registers 158, 160, and 162 may be used in place of the three comparator circuits 176, 178 and 180. The outputs of the shift register 152 and the comparator circuits 176, 178 and 180 are connected to an or gate 182 which has an output connected to an error indicator 184. The output of the shift register 156 is connected to an output point 186. A clock recovery circuit 188 is connected to the output of the receiver 150 and to a clock 190 which has an output connected to the shift registers 152, 164, 168 and 172.

In operation, the transmitted data from the transmission link 122 is received by the receiver 150 and applied to the shift registers 152, 156, 164, 168 and 172 in parallel. The shift register 152 and summing circuit 154 provide the horizontal check. The six bits of each word are summed and added to the horizontal check bit. Since the horizontal check bit was selected to make the sum of the ones in the six bit word plus the check bit equal to a predetermined odd or even number, the bit stored in the shift register 152 must always be either odd or even, for example, even at the end of each seven received bits. If the bits stored in the register 152 is odd at the end of the seven bits, an error has occurred, and a signal indicative of an error is applied to the or gate 182.

The received bits are also applied to the shift register 156 and passed therethrough to an output point 186 which may be connected to any suitable signal utilization device (not shown). The bit stream received by the receiver 150 contains a series of information bits, including the horizontal check bits, followed by the vertical check bits 64–70, 64'–68' and 64''–67''. The number of stages in the shift register 156 has been chosen to be equal to the total number of vertical check bits transmitted at the end of the bit stream. Hence, at the end of each transmission, all of the vertical check bits received by the system are loaded into the shift register 156.

The shift register systems 158, 160 and 162 of FIG. 5 are similar in structure and operation to the vertical check bit generating shift register systems 106, 104 and 102 of FIG. 4. Each of the shift register systems 158, 160 and 162 receives the information bits from the receiver 150 in parallel and regenerates the vertical check bits from the received information bits. The shift register system 158 regenerates the vertical check bits 64''–67'', the shift register system 160 regenerates the bits 64'–68' and the shift register system 162 regenerates the bits 64–70 from the received information bits. The regenerated vertical check bits present in the shift registers 164, 168 and 172 are compared with the received vertical check bits (which were generated by the shift register systems 102, 104 and 106) present in the shift register 156. The comparison is made by the comparator circuits 176, 178 and 180, and any lack of correspondence between the received and regenerated vertical check bits causes an error signal to be generated and applied to the or gate 182.

The or gate 182 provides an error signal to the error indicator 184 any time an error signal is received at any one of the inputs thereto. The error indicator 184 may be a simple indicator, such as, for example, an indicator lamp, or may be connected to a circuit which initiates retransmission of the message by the encoder in the event an error has been detected. The retransmission may be initiated at any point in the sequence such as, for example, when an error is detected in a horizontal check and an error signal is provided by the shift register 152. If an error is detected during a horizontal check, a vertical check is not necessary, and the entire message need not be transmitted, but rather a request for retransmission may be initiated immediately, thereby reducing transmission time.

The structure of the decoder is relatively simple, and the entire message need not be stored while the checks are being made. All of the regenerated check bits are generated in parallel, to reduce the time required for checking. The decoder may be further simplified by eliminating the shift register 156 and checking each incoming vertical check bits with the regenerated vertical check bits present in the shift registers 164, 168 and 172 on a bit by bit basis as received. Any degree of error detection may be provided, with a greater or lesser number of independent vertical checks being employed as required. In addition, the system may be used in conjunction with an error correcting code, such as, for example, a half rate error correcting code to provide a greater degree of accuracy. If used in conjunction with a convoluntional error correcting code, the accuracy of error detection is greatly increased due to the error multiplying effect of convolutional codes. In a convoluntional code, if an error is wrongly corrected, several additional errors are generated. The generation of additional errors provides a greater probability of detection by the multi-level error detection system according to the invention to provide an extremely high probability of error detection.

I claim:

1. A decoder for an error detecting information transfer system comprising:

means for receiving a predetermined sequence of digits, such sequence including first check digits spaced apart by equal numbers of information digits and second and third groups of check digits adjacent the end of the sequence;

first digit generating means connected to said receiving means for receiving said predetermined sequence of digits and generating a first series of similar digits each digit of which represents the sum of a predetermined group of digits in said sequence of digits;

second digit generating means connected to said receiving means for receiving said predetermined sequence of digits and generating a first predetermined number of resulting digits in response to said received digits;

third digit generating means connected to said receiving means for receiving said predetermined sequence of digits and generating a second predetermined number of resulting digits in response to said received digit, said second predetermined number being different than said first predetermined number;

comparison means connected to said second and third digit generating means and to said receiving means for comparing each of said check digits with one of said first and second resulting digits; and indicating means connected to said first digit generating means and said comparison means for indicating a dissimilar digit in said first series of digits and for indicating non-comparison between any of said check digits and said first and second resulting digits.

2. A decoder as recited in claim 1 wherein each of said second and third digit generating means includes sample and storage means for receiving and storing a plurality of digits having an input and an output and means connecting the input to the output thereof.

3. A decoder as recited in claim 2 wherein each of said sample and storage means includes a shift register having a plurality of stages, the number of stages in the shift register in said second digit generating means being different from the number of stages in the shift register in said third digit generating means.

4. A decoder as recited in claim 3 further including storage register means having a predetermined number of stages for storing said check digits connected to said receiving means, said comparison means being connected to said storage register means and said second and third digit generating means for comparing the digits stored therein.

5. A decoder as recited in claim 4 further including clock means connected to said first, second and third digit generating means, said storage register means and said comparison means.

6. A decoder as recited in claim 5 wherein the number of stages in said storage means is equal to the sum of the stages in the shift registers in said digit generating means.

7. An encoder for an error detecting information transfer system comprising:

means for receiving a predetermined sequence of information digits;

first check digit generating means coupled to said receiving means for combining groups of said information digits and inserting between each of said groups a first check digit representative of the sum of an adjacent group;

second check digit generating means coupled to said first generating means for combining said information digits and said first check digits into first predetermined groups to provide a second plurality of check digits each representative of the sum of one of said first predetermined groups;

third check digit generating means coupled to said first generating means for combining said information digits and said first check digits into second predetermined groups, different from said first predetermined groups, to provide a third plurality of check digits each representative of the sum of one of said second predetermined groups;

switch means having an input connected to said first, second and third digit generating means, and an output for sequentially providing said information and first check digits and said second and third plurality of check digits.

8. An encoder as recited in claim 7 wherein each of each second and third digit generating means includes sample and storage means having a plurality of stages, and an input and an output, the number of stages in each sample and storage means determining the number of digits in each of the second and third pluralities of check digits.

9. An encoder as recited in claim 8 wherein each of said second and third check digit generating means includes feedback means connected to the input and output of said sample and storage means and to said first digit generating means, said feedback means including means for combining digits from the output of each sample and storage means with digits from said receiving means and applying digits representative of said combined digits to the input of said sample and storage means.

10. An encoder as recited in claim 9 wherein said sample and storage means includes a shift register, and said combining means includes a modulo 2 adder.

11. The method of detecting errors in a transmitted sequence of digits comprising the steps of:

providing a sequence of information digits;

generating first check digits representative of sums of first equal groups of said information digits and inserting said check digits into said sequence at equal spaced intervals;

generating a first sequence of check digits each being representative of the sum of a first predetermined group of said information and said first check digits;

generating a second sequence of check digits each being representative of the sum of a second predetermined group of said information and said first check digits, different from said first predetermined groups;

transferring said information and said first check digits and said first and second sequences of check digits to a remote location;

receiving said information and said first check digits and said first and second sequences of said check digits at the remote location;

generating a series of similar digits each representative of the sum of one of said first equal groups of information digits and the inserted check digit;

generating a third sequence of check digits representative of sums of first predetermined groups of said received information and said first check digits, the spacing between said first predetermined groups of said received information and said first check digits being equal to the spacing of said first predetermined groups of information and first check digits;

generating a fourth sequence of check digits representative of sums of second predetermined groups of said received information and said first check digits, the spacing of said second predetermined group of said received information digits being equal to the spacing of said second predetermined group of information and first check digits;

comparing said third sequence of check digits with said first sequence of received check digits, and comparing said fourth sequence of check digits with said second sequence of received check digits; and providing an error signal indicative of one of a dissimilar digit in said series of check digits and a lack of correspondence between any of said compared sequences of check digits.

12. The method recited in claim 11 wherein each of the steps of generating said first and second sequences of check digits includes the steps of; applying said information and said first check digits to an input of a sample and storage means having a predetermined number of stages related to one of the predetermined groups of said information and said first check digits, and combining the digits from an output of said sample and storage means with the digits applied to the input thereof.

13. The method recited in claim 11 wherein each of the steps of generating said third and fourth sequences of check digits includes the steps of; applying said received information and said first check digits to an input of a sample and storage means having a predetermined number of stages related to one of the predetermined groups of said received information and said first check digits, and combining the digits from an output of said sample and storage means with the digits applied to the input thereof.

* * * * *